United States Patent
Kadowaki et al.

(10) Patent No.: US 6,661,769 B2
(45) Date of Patent: Dec. 9, 2003

(54) OPTICAL STORAGE MEDIUM, A TILT DETECTION APPARATUS, AND A DATA RECORDING AND REPRODUCING APPARATUS

(75) Inventors: Shin-ichi Kadowaki, Sanda (JP); Kousei Sano, Neyagawa (JP); Hiromichi Ishibashi, Ibaraki (JP); Shigeru Furumiya, Himeji (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 270 days.

(21) Appl. No.: 09/964,725

(22) Filed: Sep. 28, 2001

(65) Prior Publication Data

US 2002/0039338 A1 Apr. 4, 2002

(30) Foreign Application Priority Data

Sep. 29, 2000 (JP) ........................................ 2000-299880

(51) Int. Cl.⁷ .................................................. G11B 7/00
(52) U.S. Cl. ................................ 369/275.4; 369/53.19; 369/53.1
(58) Field of Search ........................... 369/47.1, 47.27, 369/53.1, 53.2, 53.41, 59.1, 275.1, 275.4, 53.19, 44.26, 44.32

(56) References Cited

U.S. PATENT DOCUMENTS 6,040,030 A * 3/2000 Utsunomiya et al. .... 369/275.4
6,567,372 B2 * 5/2003 Takamine et al. ........ 369/275.4

FOREIGN PATENT DOCUMENTS

| JP | 10-97753 | 4/1998 |
| JP | 10-162383 | 6/1998 |
| JP | 2000-57606 | 2/2000 |
| JP | 2000-123390 | 4/2000 |
| JP | 2000-137923 | 5/2000 |
| JP | 2000-149296 | 5/2000 |
| JP | 2000-149298 | 5/2000 |

* cited by examiner

Primary Examiner—Muhammad Edun
(74) Attorney, Agent, or Firm—Wenderoth, Lind & Ponack, L.L.P.

(57) ABSTRACT

Tilt of an optical storage medium is stably detected even when then the guide groove pitch is reduced and recording capacity is increased. On a disk with continuous grooves of a pitch Gp, part of tracks Gn−1 and Gn+1 adjacent to opposite sides of an n-th track Gn is eliminated, forming an area where the groove pitch is equivalent to 2·Gp. A push-pull signal from the area of groove pitch Gp and a push-pull signal from the area of groove pitch 2·Gp are differentiated to obtain a tilt error signal. Tilt can therefore be detected even when groove pitch Gp is reduced and storage capacity is increased, and a highly reliable data recording and reproducing apparatus can be provided at low cost.

9 Claims, 13 Drawing Sheets

Fig.10
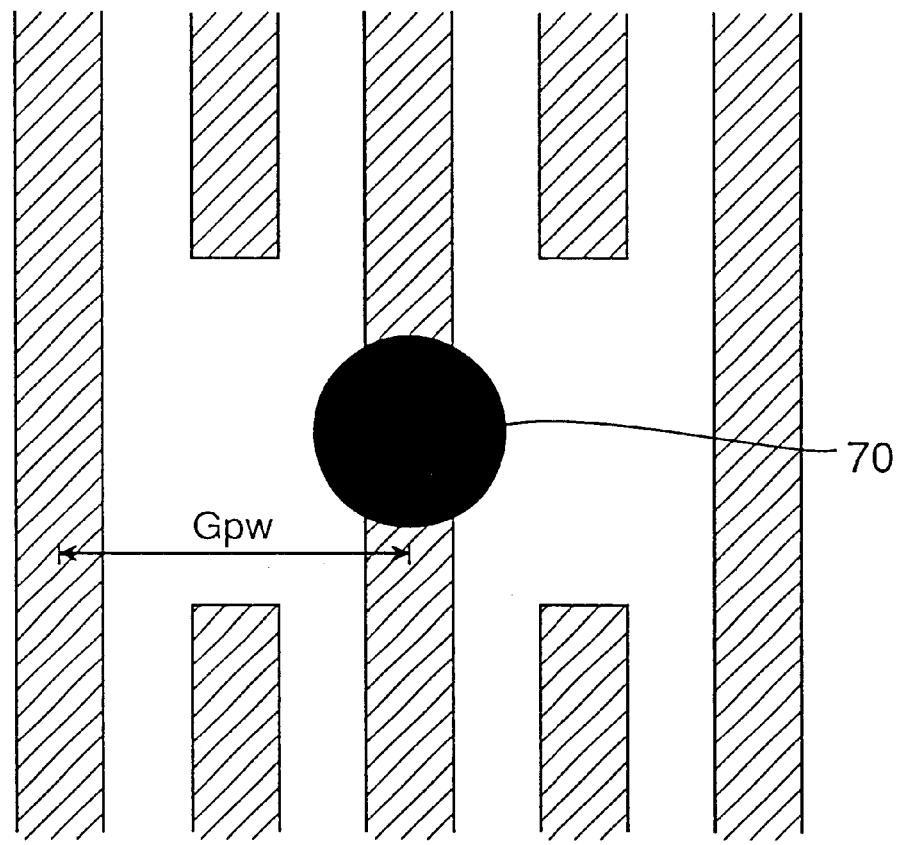
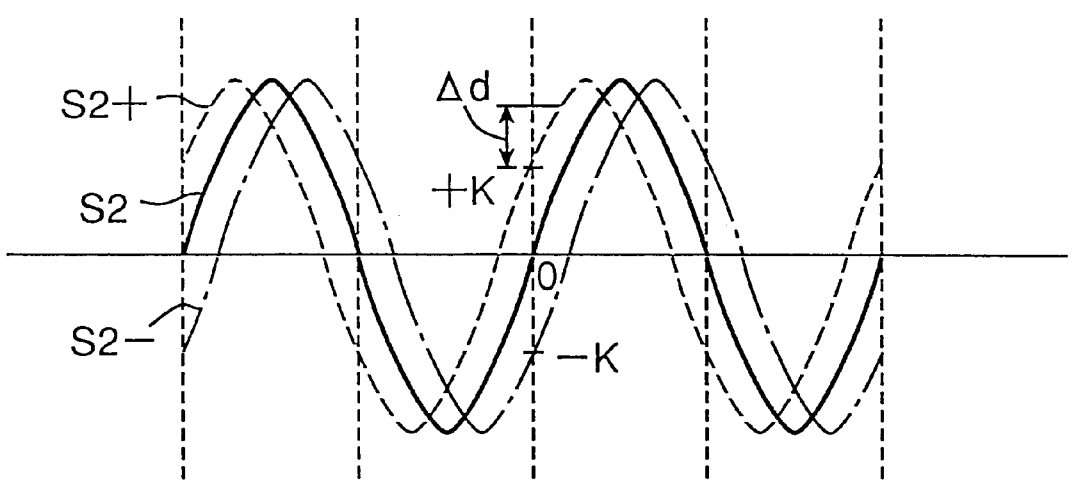

Fig.11
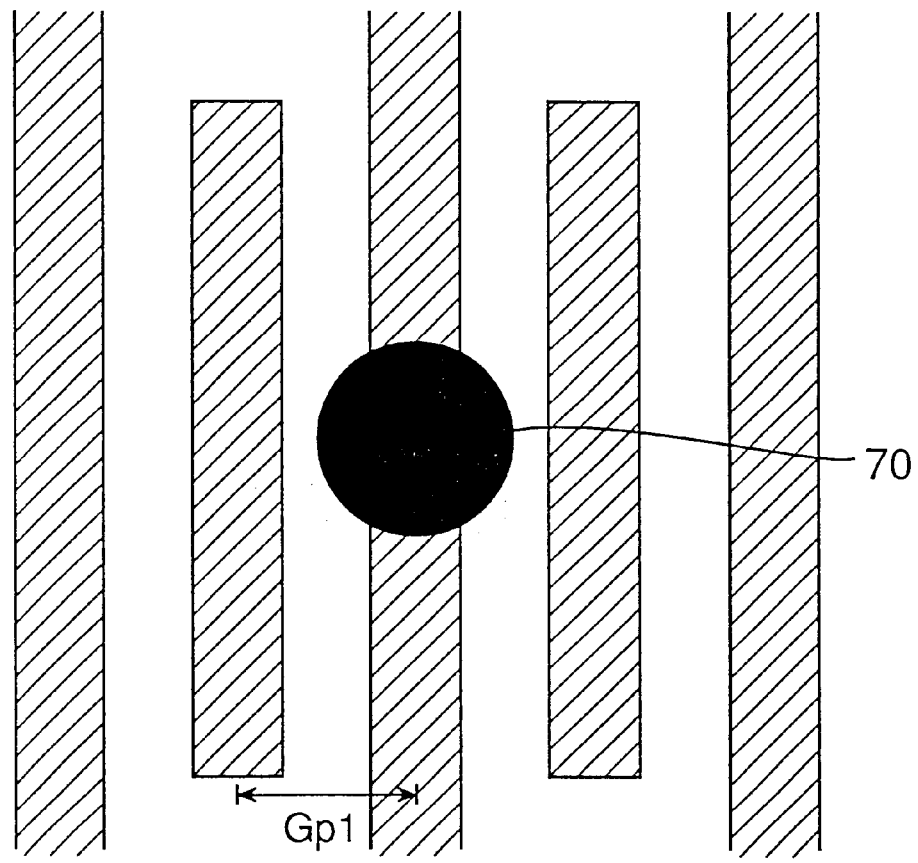
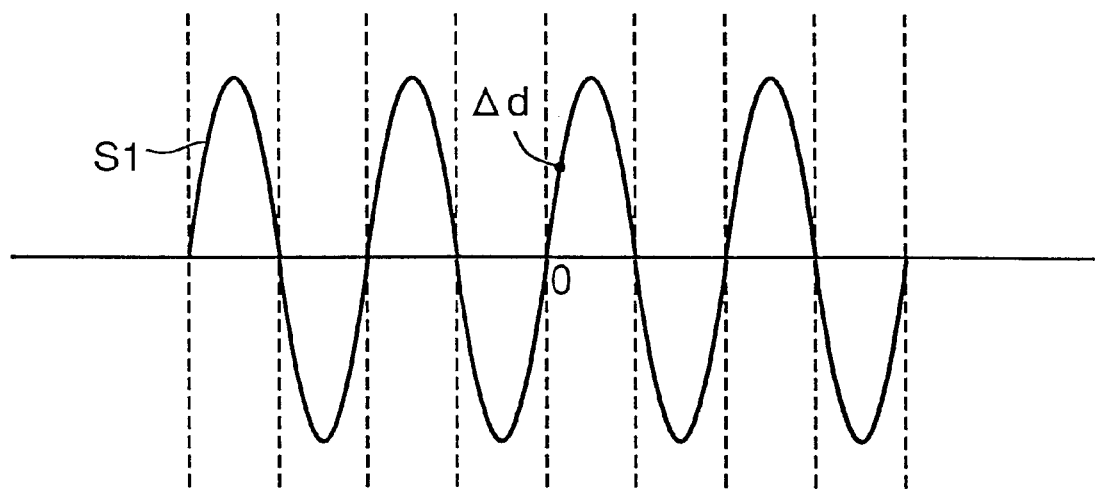

Gp= λ/2NA

Gp= λ/NA

Gp=2λ/NA

OPTICAL STORAGE MEDIUM, A TILT DETECTION APPARATUS, AND A DATA RECORDING AND REPRODUCING APPARATUS

BACKGROUND OF THE INVENTION

1. Field of the Invention

The present invention relates to an optical storage medium such as an optical disk or optical card, a data recording and reproducing apparatus for recording, reproducing, and deleting data on the optical storage medium, and a tilt detection apparatus for detecting the angle between the optical storage medium and a light beam converged by a convergent system in the data recording and reproducing apparatus.

2. Description of Related Art

Optical storage technologies using optical disks having a pattern of pits for recording data as a high density, high capacity storage medium have found applications ranging from recording digital audio and video to document filing systems and computer data file storage. Digital Versatile Disks (DVD) read with a 650 nm visible wavelength semiconductor laser as the light source have in particular recently become popular because of their high density storage capacity, and standards for read-only DVD-ROM media, write-once DVD-R media, and multiply rewritable DVD-RAM media have been established.

FIG. 15 shows the configuration of the optical system of a prior art optical pickup head system for reading DVD-ROM media as exemplary of an optical storage medium. The light source, a semiconductor laser 1, emits a divergent beam 70 of linear polarized light with a wavelength λ=0.65 μm. The divergent beam 70 is reflected by half mirror 7, bending the light path so that the beam 70 passes a collimator 8 with a 20 mm focal length and is converted to parallel light. The parallel beam 70 is then converted to a convergent beam by a 3 mm focal length objective lens 9, passes the transparent layer 40a and converges on the data recording surface 40b of the storage medium 40. The aperture of objective lens 9 is restricted by aperture 12 to a numerical aperture NA of 0.6. The thickness of the transparent layer 40a is 0.6 mm.

The beam 70 reflected from the data recording surface 40b passes the objective lens 9 and collimator 8, then passes the half mirror 7 and astigmatism is introduced. The beam 70 then passes a concave lens 11 with a tilted optical axis, thereby correcting the astigmatism and coma introduced when the beam 70 passed the half mirror 7, and is received by a photodetector 31. Axis 31e is parallel to the image of the recording track on data recording surface 40b in the beam received by the photodetector 31.

The photodetector 31 has four receiving parts 31a to 31d, each outputting a current signal 131a to 131d according to the amount of light detected. Each of the receiving parts 31a to 31d is 50 μm×50 μm. The current signals 131a to 131d output from the receiving parts 31a to 31d are respectively input to circuit part 51a to 51d of current-voltage conversion circuit 51, converted thereby to a voltage signal V51a to V51d, and output from the optical pickup head system.

A focusing error signal is calculated from the signals V51a to V51d output from the optical pickup head system using an astigmatism method, that is, as (V51a+V51c)−(V51b+V51d). When the medium is a DVD-ROM as in this example, a tracking error signal is obtained using a differential phase detection (DPD) method comparing the phase of V51a~V51d; if the medium is a DVD-RAM, the tracking error signal is calculated using a push-pull method, that is, by calculating (V51a+V51d)−(V51b+V51c). The focusing error signal and tracking error signal are amplified to a desired level and phase-compensated, then supplied to actuators 91 and 92 for focus and tracking control.

If the numerical aperture NA of the objective lens 9 is increased to 0.6, it will not be possible to faithfully read data recorded to the storage medium 40 if warping of the storage medium 40 is great. The angle between the storage medium 40 and converged beam 70 is therefore detected using a reflection photocoupler.

This reflection photocoupler consists of light source 97 and photodetector 98. The light source 97 is a light-emitting diode. The receiving part of the photodetector 98 is divided into two parts. The signal strength of the output from the two receiving parts of the photodetector 98 varies according to the tilt of the storage medium 40. It is therefore possible to obtain a signal corresponding to the tilt of the storage medium 40 by differentially amplifying the signals output from the photodetector 98. Though not shown in the figure, the beam 70 is constantly controlled to a desired angle relative to the storage medium 40 regardless of how the storage medium 40 is warped by inclining the entire optical system, including the photocoupler and optical pickup head system, using this signal corresponding to the tilt.

However, when the warp of storage medium 40 is detected using a reflection photocoupler, the cost of the optical system is necessarily increased as a result of the additional parts and the additional steps needed for assembly.

Furthermore, because the track to which the beam used for tilt detection is emitted and the track to which the beam is emitted for reading data are different, it is not possible to sufficiently correct tilt of the optical storage medium if the tilt differs according to the position in the radial direction, and faithful signal reproduction may not be possible.

To resolve the problems associated with using a photocoupler for tilt detection, Japanese Patent Laid-Open Publication (kokai) H10-97753 (U.S. patent application Ser. No. 08/877363), Kokai 2000-57606, Kokai 2000-90948, Kokai 2000-123390, Kokai 2000-137923, Kokai 2000-149296 (U.S. patent application Ser. No. 09/386458), Kokai 2000-149298, and Kokai 2000-123390 (U.S. patent application Ser. No. 09/386458) teach a tilt detection apparatus using the DVD-RAM guide groove and the CAPA address area. This tilt detection apparatus does not require a photocoupler, and simplifies the optical design.

When a photocoupler is used for tilt detection, closed loop control is not possible without driving the entire optical system, including the photocoupler, and adjusting for tilt to the optical storage medium. The problem is that because the entire optical system is driven, adaptation to a thin data recording and reproducing apparatus is difficult.

Furthermore, because tilt detection using the guide groove and CAPA is effective when the pitch Gp of the guide groove formed on the optical storage medium is greater than λ/NA, more data can be recorded and good tilt detection can be achieved when tracks are formed on both lands and grooves as in DVD-RAM media. However, if a data track is provided in only the land or the groove, data recording capacity drops if Gp>λ/NA so that good tilt detection can be achieved, and if Gp<λ/NA so that data recording capacity is increased, good tilt detection cannot be achieved.

Considering the problems of a prior art apparatus as described above, an object of the present invention is to provide an optical storage medium, a tilt detection apparatus using the optical storage medium, and a data recording and reproducing apparatus using the tilt detection apparatus such that when a tilt detection apparatus is used to detect optical storage medium tilt, stable detection of optical storage medium tilt is possible by means of a simple configuration when the guide channel pitch is decreased in order to increase data storage capacity.

SUMMARY OF THE INVENTION

To achieve the above object, an optical storage medium according to the present invention having guide grooves with a pitch of Gp1 between adjacent grooves has intermittent grooves Gn−1 and Gn+1 adjacent to opposite sides of an n-th groove Gn with non-groove spaces formed in grooves Gn−1 and Gn+1, creating an area where pitch Gp2 of groove Gn is equivalent to twice pitch Gp1 so that $\lambda/NA \geq Gp1 \geq \lambda/(2 \cdot NA)$ where $\lambda$ is the wavelength of a beam emitted for recording or reproducing data, and NA is the numerical aperture of the convergent system for converging the beam on the optical storage medium.

A further optical storage medium having guide grooves with a pitch of Gp1 between adjacent grooves according to the present invention has an intermittent groove formed with non-groove spaces therein, forming an area where groove pitch Gp2 is equivalent to twice pitch Gp1 so that $\lambda/NA \geq Gp1 \geq \lambda/(2 \cdot NA)$ where $\lambda$ is the wavelength of the beam emitted for recording or reproducing data, and NA is the numerical aperture of the convergent system for converging the beam on the optical storage medium.

A yet further optical storage medium having guide grooves with a pitch of Gp1 according to the present invention has an intermittent groove Gn−1 or groove Gn+1 adjacent to opposite sides of an n-th groove Gn formed with non-groove spaces in groove Gn−1 or Gn+1, creating an area where groove pitch Gp2 is equivalent to greater than twice pitch Gp1 so that $\lambda/NA \geq Gp1 \geq \lambda/(2 \cdot NA)$ where $\lambda$ is the wavelength of the beam emitted for recording or reproducing data, and NA is the numerical aperture of the convergent system for converging the beam on the optical storage medium.

A tilt detection apparatus according to this invention has a laser light source for emitting a beam; a convergent system for converging the beam emitted from the light source to a small spot on a data recording medium, i.e., an optical storage medium; a photodetector for detecting the beam diffracted and reflected by the optical storage medium and outputting a signal according to the light quantity of the detected beam; and a signal processor for receiving a first signal and a second signal output from the photodetector and processing the received signal to output a signal related to the angle formed between the optical storage medium and optical axis of the convergent system. The optical storage medium has a guide groove with a pitch of Gp1 between adjacent grooves, groove Gn−1 and groove Gn+1 adjacent to opposite sides of an n-th groove Gn both being intermittent grooves with nongroove spaces formed therein, providing an area where pitch Gp2 of groove Gn is equivalent to twice pitch Gp1 so that $\lambda/NA \geq Gp1 \geq \lambda/(2 \cdot NA)$ where $\lambda$ is the wavelength of the beam emitted for recording or reproducing data, and NA is the numerical aperture of the convergent system for converging the beam on the optical storage medium. The pitch of the groove on the optical storage medium when the first signal is obtained is Gp1, and the pitch of the groove on the optical storage medium when the second signal is obtained is Gp2.

A similarly configured tilt detection apparatus according to a further aspect of this invention detects tilt between the emitted light beam and an optical storage medium having guide grooves with a pitch of Gp1 between adjacent grooves, an intermittent groove being formed with non-groove spaces therein, providing an area where groove pitch Gp2 is equivalent to twice pitch Gp1 so that $\lambda/NA \geq Gp1 \geq \lambda/(2 \cdot NA)$ where $\lambda$ is the wavelength of the beam emitted for recording or reproducing data, and NA is the numerical aperture of the convergent system for converging the beam on the optical storage medium. The pitch of the groove on the optical storage medium when the first signal is obtained is Gp1, and the pitch of the groove on the optical storage medium when the second signal is obtained is Gp2.

A tilt detection apparatus according to a yet further aspect of this invention and also configured as described above detects tilt between the emitted light beam and an optical storage medium having guide grooves with a pitch of Gp1 between adjacent grooves, groove Gn−1 or groove Gn+1 adjacent to opposite sides of an n-th groove Gn being an intermittent groove with non-groove spaces formed therein, providing an area where groove pitch Gp2 is equivalent to greater than twice pitch Gp1 so that $\lambda/NA \geq Gp1 \geq \lambda/(2 \cdot NA)$ where $\lambda$ is the wavelength of a beam emitted for recording or reproducing data, and NA is the numerical aperture of the convergent system for converging the beam on the optical storage medium. The pitch of the groove on the optical storage medium when the first signal is obtained is Gp1, and the pitch of the groove on the optical storage medium when the second signal is obtained is Gp2.

A data recording and reproducing apparatus according to this invention has a tilt detection apparatus as described; a drive unit for changing a relative position between the optical storage medium and tilt detection apparatus; and an electric signal processor for receiving and processing a signal output from the tilt detection apparatus to obtain desired information stored on the optical storage medium.

It is therefore possible to detect relative tilt between an emitted light beam and an optical storage medium using an operation on two signals obtained from guide grooves with different groove pitchs even when the guide groove pitch is reduced and recording capacity increased. It is therefore possible to provide a highly reliable data recording and reproducing apparatus.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 10 describes the operation where the groove pitch is Gpw;

FIG. 11 describes the operation where the groove pitch is Gp1;

DETAILED DESCRIPTION OF THE PREFERRED EMBODIMENTS

Figure 1:
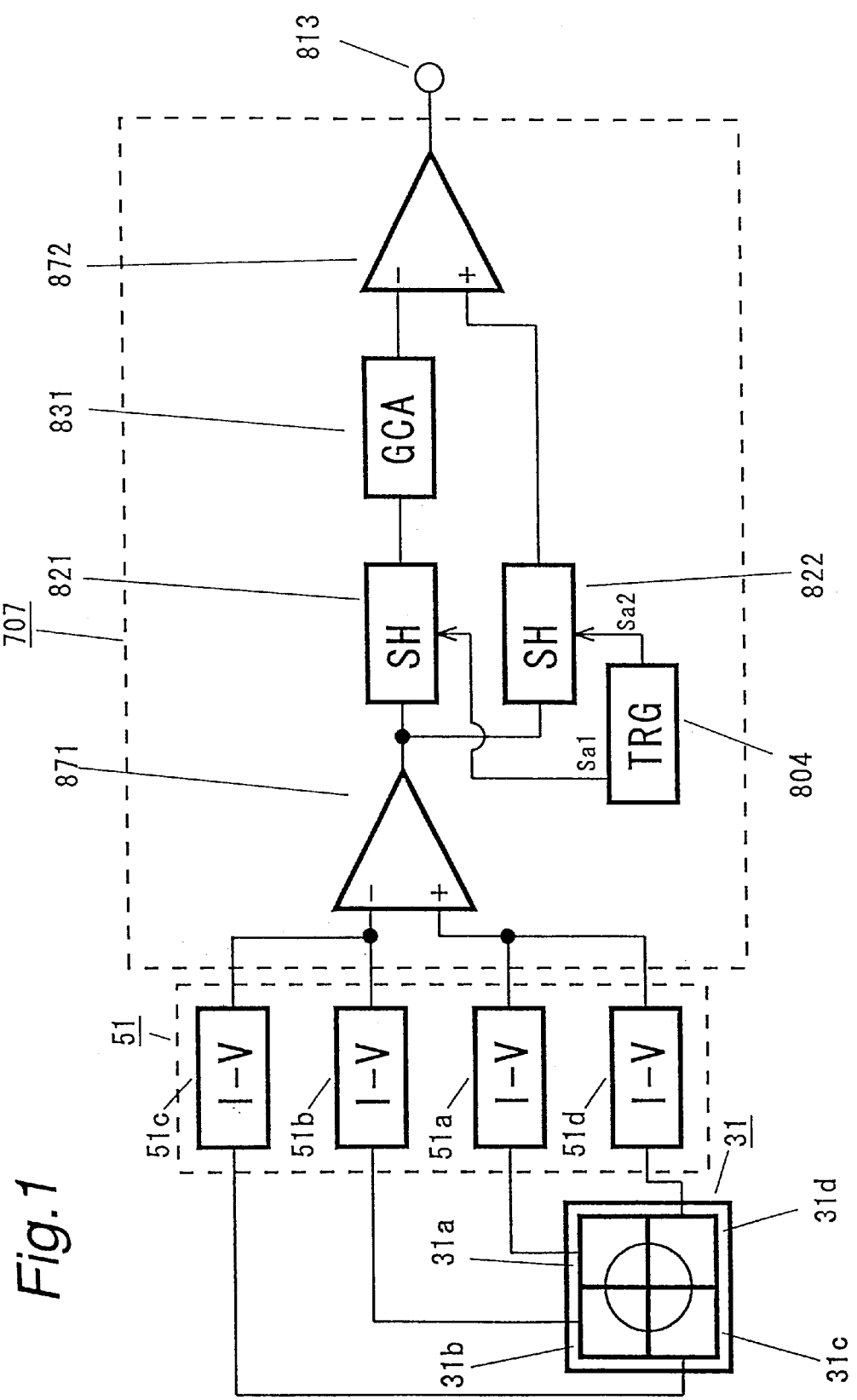
FIG. 1 shows the configuration of a signal processing circuit in a tilt detection unit according to a first embodiment of the present invention.

The preferred embodiments of an optical storage medium, tilt detection apparatus, and data recording and reproducing apparatus according to the present invention are described below with reference to the accompanying figures. It will be noted that like reference numerals in the figures indicate the same or functionally and operationally like parts.

Embodiment 1

Figure 15:
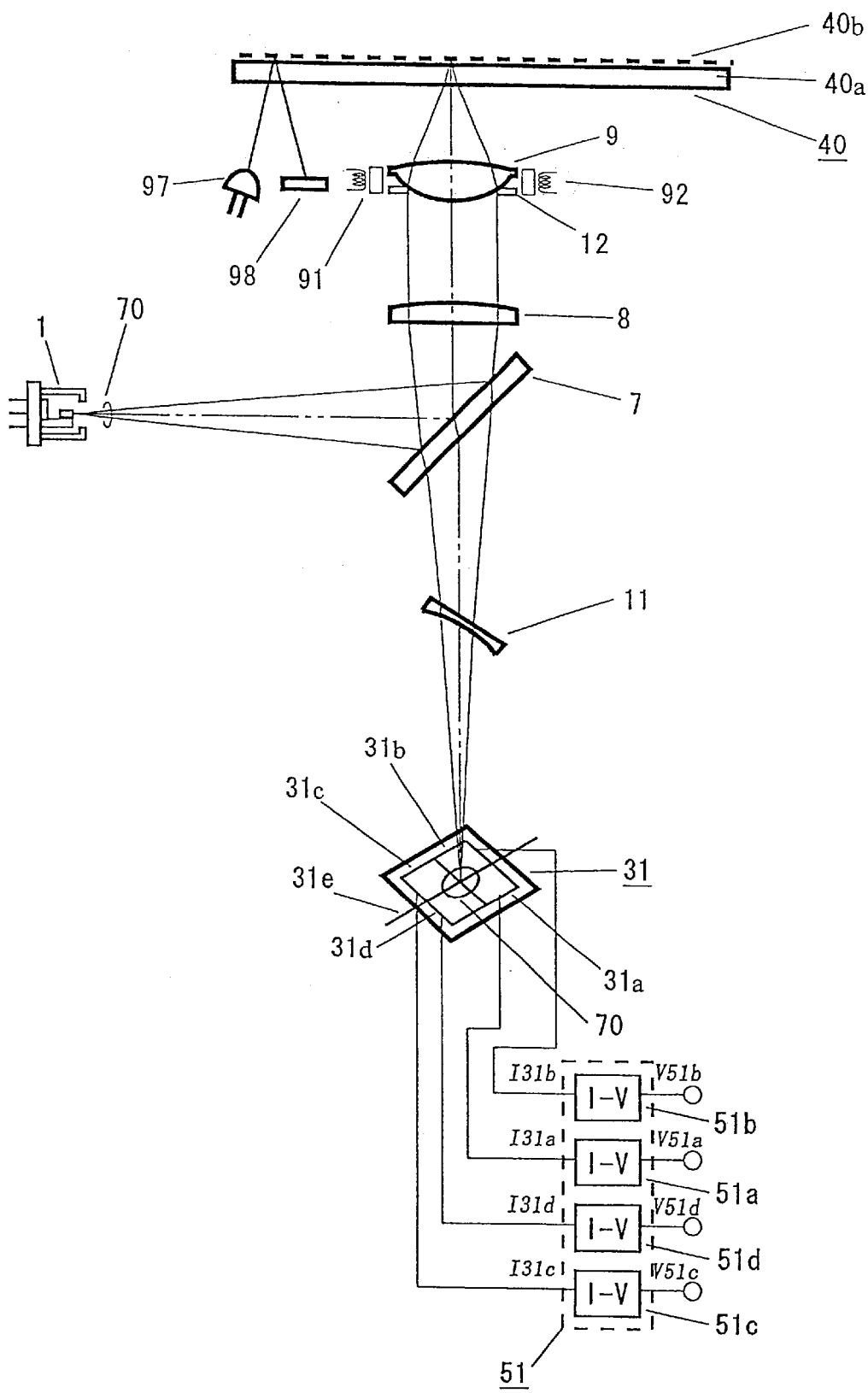
FIG. 15 shows the configuration of a prior art tilt detection apparatus.

FIG. 1 shows the configuration of a signal processor 707 in a tilt detection apparatus according to a first embodiment of the invention. A prior art optical pickup head system such as shown in FIG. 15, for example, can be used for the optical pickup head system for conducting a beam emitted from a light source to an optical storage medium and detecting the reflected beam by the optical storage medium. The wavelength $\lambda=0.65$ $\mu$m and the numerical aperture NA of the objective lens is 0.6. However, the reflection photocoupler comprising a light source 97 and photodetector 98 as shown in FIG. 15 are not necessary in the present invention because an optical storage medium 41 as further described below is used.

Signals output from receiving parts 31a to 31d of the photodetector 31 are current-voltage converted by circuit parts 51a to 51d of the current-voltage conversion circuit 51. Operator 871 applies the same differential operation used to obtain the tracking error signal to the signals output from the current-voltage conversion circuit 51. The operator 871 outputs a push-pull signal. Signal output from the operator 871 is sampled by sample-and-hold units 821 and 822. Trigger signal generator 804 generates the timing signal indicating the timing at which the sample-and-hold units 821 and 822 sample the signal input. Because the amplitudes of the signals output from the sample-and-hold units 821 and 822 are different, the signal output from sample-and-hold unit 822 is amplified by variable gain amplifier 831 so that the amplitude equals that of the signal output from sample-and-hold unit 821. The signal output from sample-and-hold unit 821 and the signal output from variable gain amplifier 831 are differentiated by operator 872, the output signal of which is output from terminal 813 and used as the signal indicating the tilt between the optical storage medium 41 and the axis of the converged beam.

Figure 2:
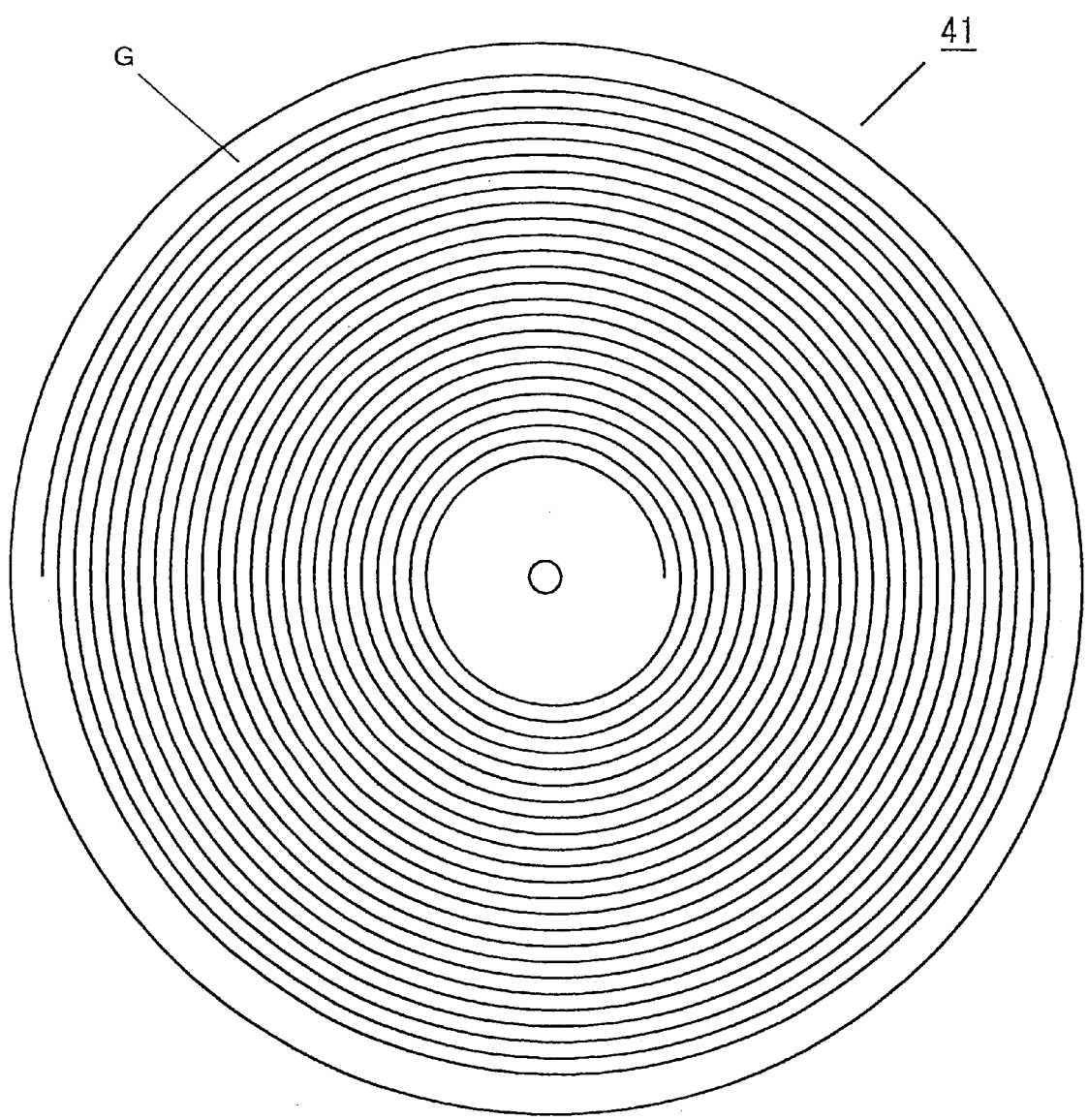
FIG. 2 shows the conceptual configuration of an optical storage medium in a tilt detection unit according to a first embodiment of the present invention.

FIG. 2 shows the basic structure of the guide groove G on the optical storage medium 41. The optical storage medium 41 is disk shaped with a spiral guide groove G formed as the track. The disk is 0.6 mm thick.

Figure 3:
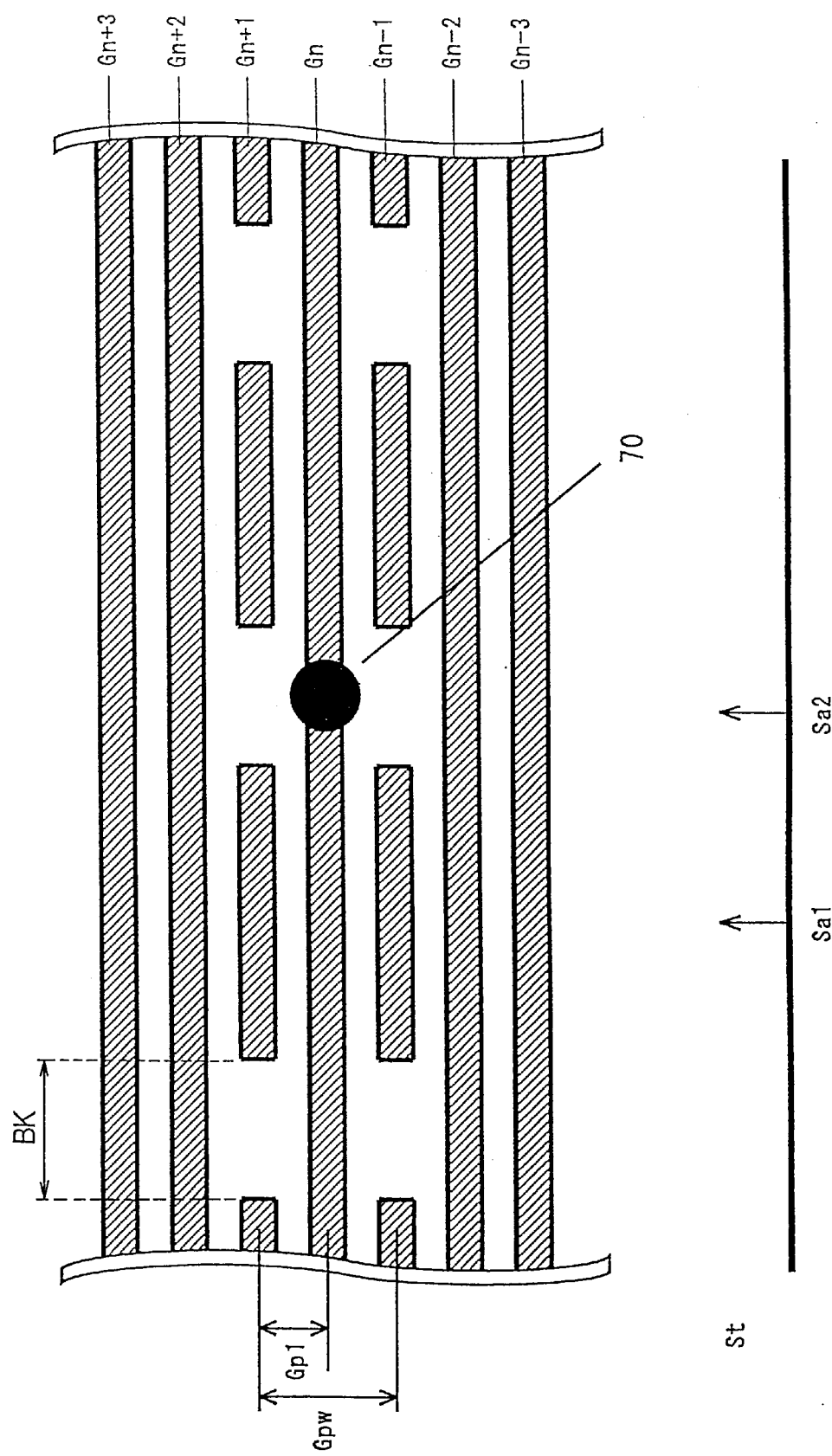
FIG. 3 shows the configuration of an optical storage medium in a tilt detection unit according to a first embodiment of the present invention.

FIG. 3 shows the structure of the guide groove G on optical storage medium 41 in greater detail. Gn−3 . . . Gn+3 indicate guide grooves offset n−3 to n+3 from guide groove Gn. Pitch Gp1 radially measured between the centers of neighboring guide grooves is 0.62 $\mu$m. Tilt detection is possible by imparting a specific feature to five guide grooves. Tilt is detected when the beam is emitted to guide groove Gn. Groove Gn−1 and Gn+1 are formed with part of each groove missing, that is, as an intermittent groove. The length BK of a non-groove space, i.e., the section where the groove is eliminated is 4 $\mu$m. When the beam from the optical pickup head system scans groove Gn along the track in order to record or reproduce data, the converged beam 70 senses the groove pitch as though it were Gpw in the area where groove Gn−1 and groove Gn+1 are missing. Part of groove Gn−3 and groove Gn+3 must also be eliminated in order to truly change the groove pitch, but if $Gp1>\lambda/(2\cdot NA)$, the converged beam from the optical pickup head system will effectively sense the groove pitch to be Gpw even without eliminating part of groove Gn−3 and groove Gn+3. Gpw is twice Gp1; when Gp1 is 0.62 $\mu$m, Gpw is 1.24 $\mu$m. The timing of the timing signals generated by the trigger signal generator 804 are Sa1 and Sa2, which respectively are equivalent to the timing at which the beam from the optical pickup head system scans the guide grooves at pitch Gp1 and Gpw. Operator 871 outputs a signal identical to a tracking error signal obtained with a push-pull technique, and the signals that are sampled and held by sample-and-hold units 821 and 822 are push-pull signals with a groove pitch of 0.62 $\mu$m and 1.24 $\mu$m, respectively. It is known from Japanese Patent Laid-Open Publication (kokai) 10-97753 (U.S. patent application Ser. No. 08/877363) that when the beam from the optical pickup head system becomes tilted to the optical storage medium, the zero cross point of the push-pull signal moves to a position offset from the track center (the groove center) radially to the optical storage medium. Japanese Patent Laid-Open Publication (kokai) 10-97753 (U.S. patent application Ser. No. 08/877363) is incorporated herein by reference.

This offset is closely related to the groove pitch Gp, light source wavelength $\lambda$, and numerical aperture NA, and is pronounced when $GP>\lambda/NA$. It will be noted that $Gp1<\lambda/NA$ and $Gpw>\lambda/NA$ in this embodiment because the light source wavelength $\lambda=0.65$ $\mu$m, objective lens numerical aperture NA=0.6, groove pitch Gp1=0.62 $\mu$m and Gpw=1.24 $\mu$m. As a result, movement of the zero cross point of the push-pull signal indicative of tilt to the optical storage medium from the groove center is small when the groove pitch is Gp1 and great when the groove pitch is Gpw. The signal output from operator 872 is therefore a tilt detection signal.

The tilt detection principle is described next with reference to FIGS. 10 to 14.

In FIG. 11 a sine wave push-pull signal Si with cycle equal to groove pitch Gp1 is generated when the converged beam 70 is perpendicularly incident to the optical storage medium, that is, is not tilted to the optical storage medium, and crosses the groove perpendicularly. The same push-pull signal S1 is generated when the optical storage medium is tilted.

In FIG. 10, a sine wave push-pull signal S2 with one cycle equal to groove pitch Gpw is generated when the optical storage medium is not tilted and the beam 70 crosses the groove perpendicularly. When the optical storage medium is tilted in the positive direction relative to the optical axis of the beam 70, the phase of the sine wave advances and push-pull signal S2+ is output. Conversely, when the optical storage medium is tilted in the negative direction relative to the optical axis of the beam 70, the phase of the sine wave is delayed and push-pull signal S2− is output.

Tracking control during recording and reproducing operations causes the beam 70 to move along the track rather than crossing the track perpendicularly.

The push-pull signal sampled at time Sa1 in FIG. 3 is held by sample-and-hold unit 821. The push-pull signal sampled at time Sa2 is held by sample-and-hold unit 822. The two sampled push-pull signals are compared by operator 872.

If the beam 70 is following the center of the groove, the signal held by sample-and-hold unit 821 is zero. If there is no optical storage medium tilt at this time, the signal held by sample-and-hold unit 822 is also zero. The difference between the signals from sample-and-hold units 821 and 822 is therefore zero, indicating that there is no optical storage medium tilt.

If the beam 70 is following the center of the groove but the optical storage medium is positively tilted, the signal held by sample-and-hold unit 821 is zero but the signal held by sample-and-hold unit 822 is +K. The difference between the signals from sample-and-hold units 821 and 822 is therefore +K, indicating that the optical storage medium tilt is positive. The amount of tilt is proportional to K. This same concept applies when the optical storage medium is negatively tilted.

If the beam 70 follows a position offset from the groove center and the optical storage medium is positively tilted, the signal held by sample-and-hold unit 821 will be Dd and the signal held by sample-and-hold unit 822 will be +K+Dd. The difference between the signals from sample-and-hold units 821 and 822 will be +K, indicating that the optical storage medium tilt is positive.

It will thus be apparent that optical storage medium tilt can be easily detected without providing a special external configuration by simply changing the pitch of grooves on the optical storage medium.

The reason why the length of the groove pitch may or may not appear in the push-pull signal is described next.

The converged beam 70 contains both the direct beam directly reflected from the optical storage medium, and primary and secondary reflected light diffracted by the edges of the groove and appearing on both sides of the direct beam. The distance between the first diffracted light and second diffracted light decreases as the groove pitch Gp increases. When the first diffracted light and second diffracted light approach, they partially overlap in the middle of the photodetector 31 and an eye pattern with bright areas forms. When the optical storage medium is tilted, a difference occurs in this bright part between the light incident on the right halves 31a and 31b of the photodetector 31 and the light incident on the left halves 31c and 31d, and a phase difference such as signal S2+ and S2− occurs.

Figure 12:
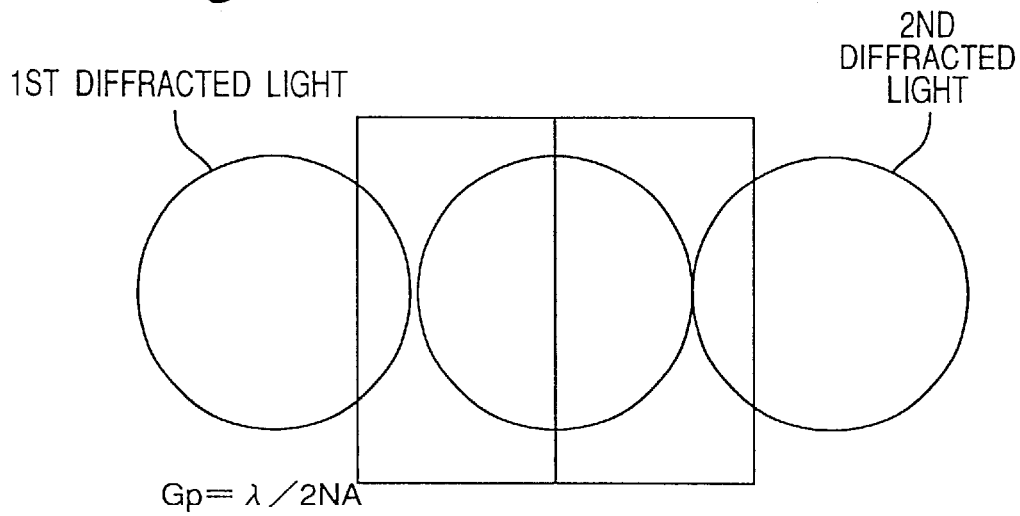
FIG. 12 shows the relationship between first diffracted light and second diffracted light when $Gp=\lambda/2NA$.

As shown in FIG. 12, Gp=$\lambda$/2NA for the first diffracted light and second diffracted light appearing on both sides of the direct beam where $\lambda$ is the wavelength of the beam emitted when recording or reproducing data, and NA is the numerical aperture of the optical system converging the beam on the optical storage medium.

Figure 13:
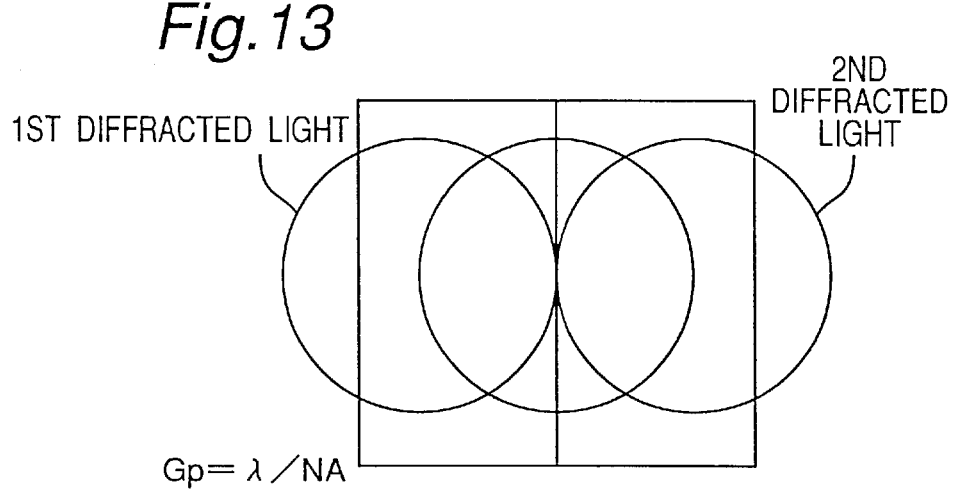
FIG. 13 shows the relationship between first diffracted light and second diffracted light when $Gp=\lambda/NA$.

As shown in FIG. 13, Gp=$\lambda$/NA is the condition for the first diffracted light and second diffracted light being adjacent.

Figure 14:
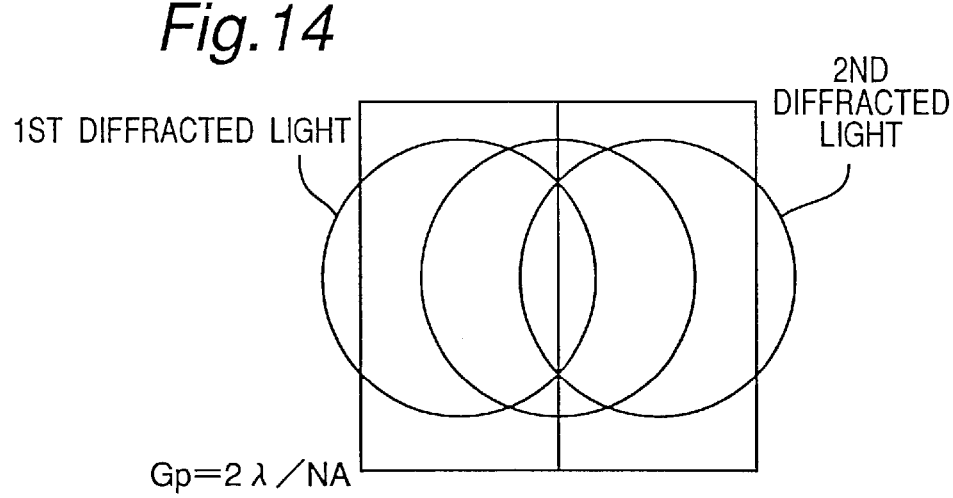
FIG. 14 shows the relationship between first diffracted light and second diffracted light when $Gp=2\lambda/NA$.

As shown in FIG. 14, Gp=2$\lambda$/NA is the condition for the first diffracted light and second diffracted light overlapping radially.

The pitch Gp1 of a normal groove is therefore selected in this embodiment so that $\lambda/2NA \leq Gp1 \leq \lambda/NA$ and the pitch Gpw where part of the groove is eliminated is $\lambda/NA \leq Gpw \leq 2\lambda/NA$.

Figure 4:
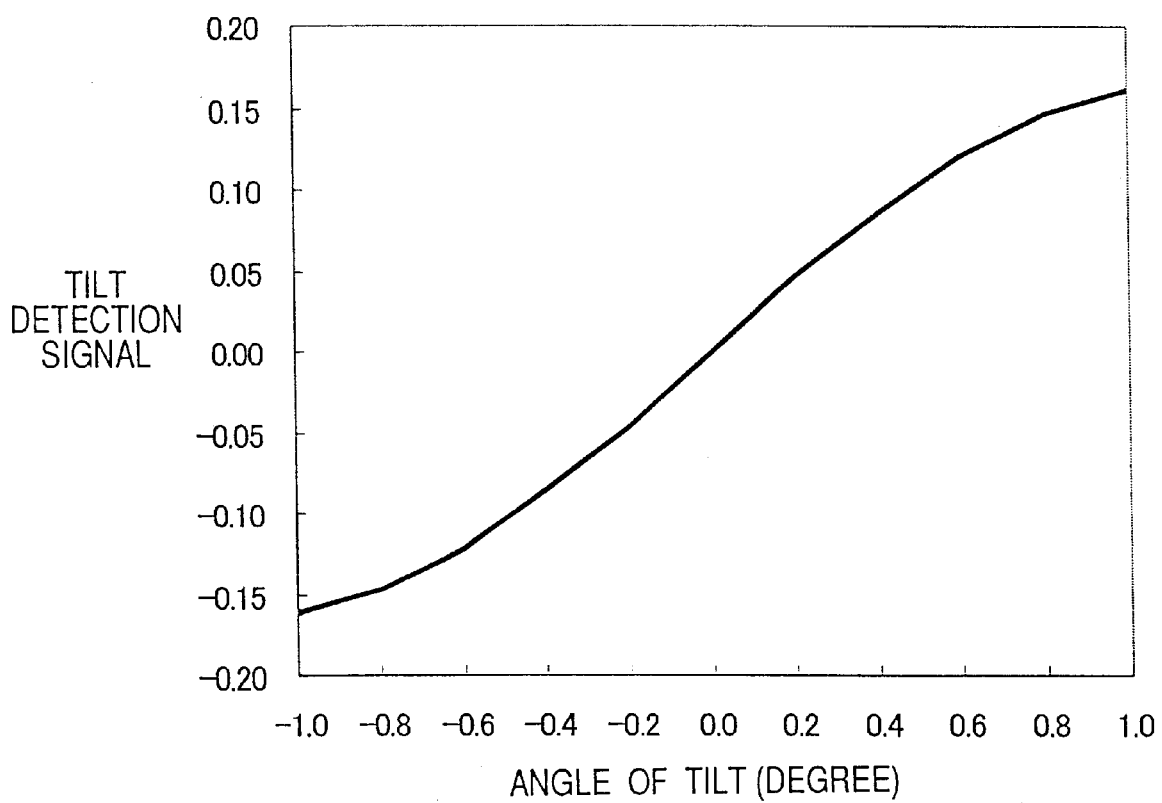
FIG. 4 shows a tilt detection signal obtained in a tilt detection unit according to a first embodiment of the present invention.

FIG. 4 shows an example of the tilt detection signal obtained from a tilt detection apparatus according to this embodiment of the invention. It should be noted that a good tilt detection signal is obtained. When the objective lens is driven by an actuator for tracking control, an extraneous offset dependent on the eccentricity of the optical storage medium is mixed with the signal sampled and held by sample-and-hold units 821 and 822. To reduce this offset, a configuration using a holographic optical element for the element guiding the beam to the photodetector and driving the objective lens and holographic optical element as a single component, a method for correcting offset by a differential operation emitting three beams to the optical storage medium as described in Japanese Patent Laid-Open Publication (kokai) 10-162383, or a general method reducing offset in a push-pull signal, can be used. If tracking control is achieved by driving the entire optical system, correcting the offset of the tracking error signal is not necessary.

Although not described here in detail, the photodetector 31 is a photodetector normally used in a data recording and reproducing apparatus for detecting the focusing error signal, tracking error signal, and the data signal recorded to the optical storage medium, and can be used for tilt detection. This means that it is not necessary to provide a new part as a detector for detecting tilt. Because new parts are not needed, the assembly and adjustment processes are accordingly simplified, and a low cost, small tilt detection apparatus can be achieved. Furthermore, a high reliability data recording and reproducing apparatus can be provided because tilt detection is not susceptible to temperature change and aging.

Tracking control can also be achieved using the push-pull signal when the groove pitch Gp is Gp1. Furthermore, because Gp1<$\lambda$/NA at this time, the offset of the zero cross point of the tracking error signal from the groove center radially to the optical storage medium is small even when the optical storage medium is tilted to the beam from the optical pickup head system. In other words, even when the light beam is tilted to the optical storage medium, the beam from the optical pickup head system can be constantly emitted to the center of the track. As a result, the jitter deterioration due to crosstalk or cross erase is small, and a data recording and reproducing apparatus that is highly reliable compared with a prior art device that detects tilt using the CAPA can be provided. In addition, compatibility is improved when multiple different optical head devices and data storage media are used.

Furthermore, when manufacturing an optical storage medium having data recorded to the groove or the land where Gp1<$\lambda$/NA, it is sufficient to optimize the characteristics for recording data to the land or the track, thereby significantly relieving the demand for precision when forming the recording layer on the optical storage medium. The same is true for managing the groove depth: groove depth must be precisely controlled in order to reduce crosstalk from an adjacent track with land and groove recording, but if data is recorded to only lands or grooves, groove depth is less essential and demand for precision in layer formation is relieved. Yield is thus improved in optical storage medium production, and media cost is reduced. As will be known from the fact that the groove pitch of 2.6 GB capacity DVD-RAM media, which records data to both lands and grooves, is 1.48 μm and the groove pitch of DVD-RW media, which records to only grooves, is 0.74 μm, the groove pitch when data is recorded to both lands and grooves must be greater than the groove pitch when data is recorded to only lands or only grooves in order to faithfully record and reproduce the signal. By appropriately designing the groove pitch, it is therefore possible to achieve the same recording capacity with land or groove recording as it is with land and groove recording.

It is only necessary to provide enough tilt detection grooves to assure that the tilt of the optical storage medium can be effectively detected with no problem. One tilt detection groove per 1000 grooves in the radial direction of the optical storage medium is therefore sufficient. Furthermore, if the tracks of the optical storage medium are divided into a number of zones, tilt detection can be enabled without reducing recording capacity by providing the tilt detection groove at the zone boundaries. Of course the tilt detection grooves can be provided more frequently than every zone if it is desirable to increase tilt detection precision, and can be provided less frequently if tilt detection precision can be reduced. In this case the storage capacity of each optical storage medium can be increased. How frequently (at what interval) the tilt detection grooves are provided is a design factor to be decided based on the desired recording capacity and detection precision, and can be changed in many ways. The tilt detection track and data recording/reproducing track can be the same track or very close different tracks. Data can therefore recorded and reproduced with good tilt control even with media in which the tilt angle changes at inside and outside circumferences, and a highly reliable data recording and reproducing apparatus can therefore be provided.

Insofar as length BK of the non-groove spaces where parts of groove Gn−1 and groove Gn+1 are removed is greater than λ/(2·NA), length BK is not particularly limited, and sample-and-hold units 821 and 822 can sample the signal from operator 871 at a desired timing. Furthermore, a tilt detection signal can be obtained by sampling at least one point at timing Sa1 and Sa2. Compared with the configuration taught in Japanese Patent Laid-Open Publication (kokai) 2000-149298 for obtaining a tilt detection signal with the DPD method, the area required for tilt detection is narrower and the optical storage medium of this invention is therefore greater. Detecting and correcting the AC tilt component of the optical storage medium is, of course, also possible by providing several to several dozen areas with a groove pitch of Gpw around the circumference of the disk, and it is therefore possible to further increase the reliability of a data recording and reproducing apparatus having this tilt detection apparatus.

This embodiment has been described using a disk-shaped optical storage medium as the data recording medium, but the shape and materials of the medium shall not be limited insofar as a groove as taught herein is provided. A rectangular card medium or other various shape could, for example, be used. The data recording layer can be a phase change layer, magneto-optical layer, magnetic layer, or other. Layer thickness is also not limited by tilt detection as described above, and is a design factor determined by the wavelength of the light source, numerical aperture of the objective lens, and recording density.

The tilt detection apparatus of this invention can be applied to any optical system design as long as a push-pull signal can be detected, and can be changed in various ways according to factors such as the focusing error signal detection method and optical system design. The light source wavelength λ, objective lens numerical aperture NA, and groove pitch Gp can also be changed. For example, if light source wavelength λ=0.405 μm, objective lens numerical aperture NA=0.85, groove pitch Gp1=0.32 μm, and the layer thickness is 0.1 mm, the invention can be applied to an even higher capacity data recording and reproducing apparatus.

The method used to generate timing Sa1 and Sa2 is also not specifically described herein because various methods known from the literature can be used, including, for example, generating the clock using a wobble groove, eliminating a groove at a regular pitch and generating the clock from this pitch, and generating the clock from the recorded data.

Embodiment 2

Figure 5:
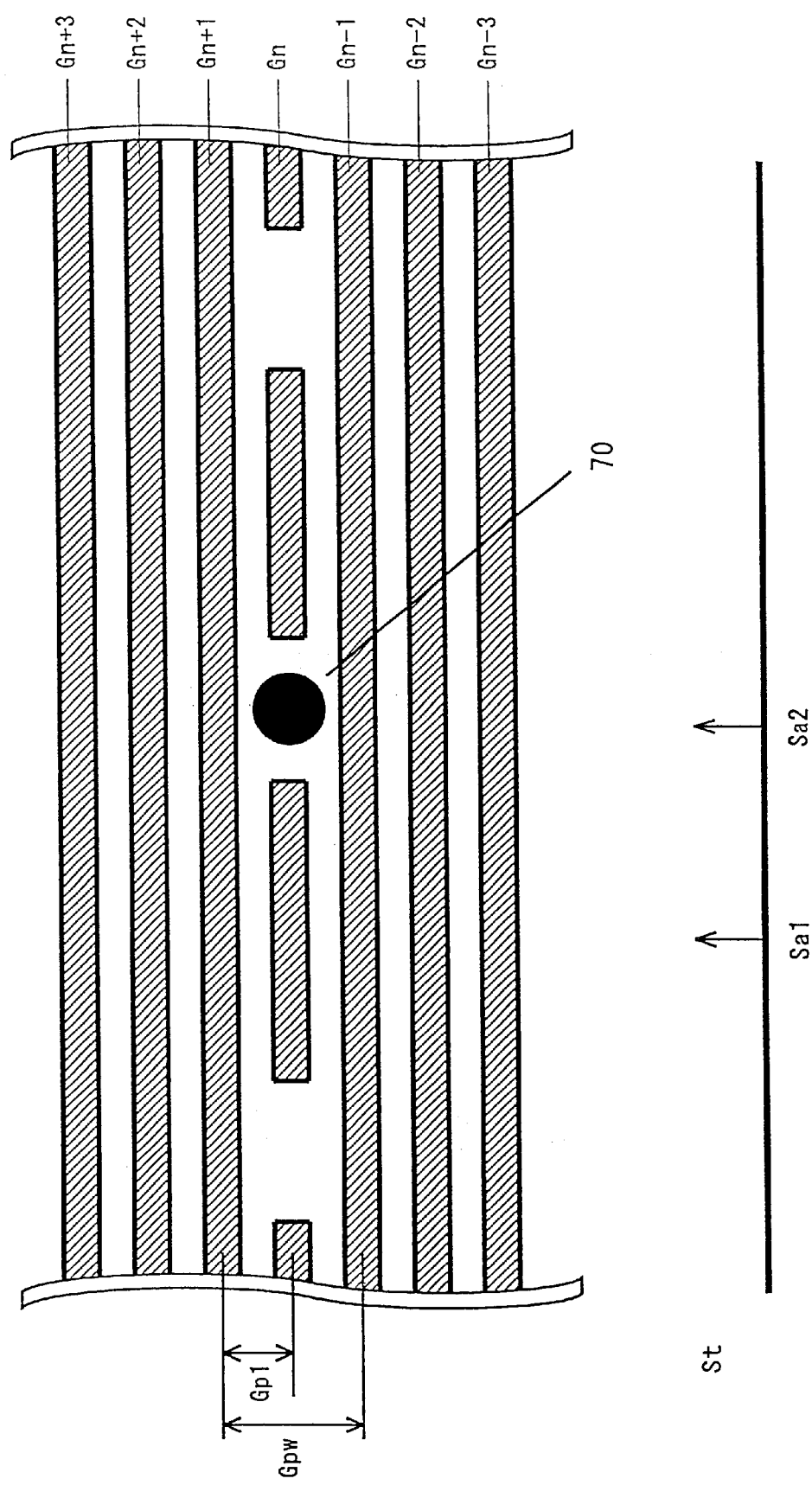
FIG. 5 shows the configuration of an optical storage medium in a tilt detection unit according to a second embodiment of the present invention.

FIG. 5 shows the configuration of a data recording medium in a tilt detection apparatus according to a further embodiment of the present invention. Gn−3, . . . Gn+3 are guide grooves as in the first embodiment. Tilt detection can be achieved from a characteristic feature of three guide grooves. If guide groove Gn is the guide groove used for tilt detection when a beam is emitted, groove Gn is an intermittent groove having part of the guide groove eliminated at a certain interval. Where the guide groove of groove Gn is eliminated, the groove for the adjacent guide grooves Gn−1 and Gn+1 is not eliminated. As a result, when the beam from the optical pickup head system scans the groove Gn track to record or reproduce data, the beam 70 senses the groove pitch where groove Gn is absent as though it was Gpw. Part of grooves Gn−2 and Gn+2 must also be eliminated to actually change the groove pitch, but if Gp>λ/(2·NA), the beam converged from the optical pickup head system actually senses the groove pitch to be Gpw without eliminating part of grooves Gn−2 and Gn+2.

Gpw is twice Gp1; when Gp1 is 0.62 μm, Gpw is 1.24 μm. The timing at which trigger signal generator 804 generates the timing signal is Sa1 and Sa2, equivalent to the timing at which the beam from the optical pickup head system scans the guide grooves of pitch Gp1 and Gpw.

Figure 6:
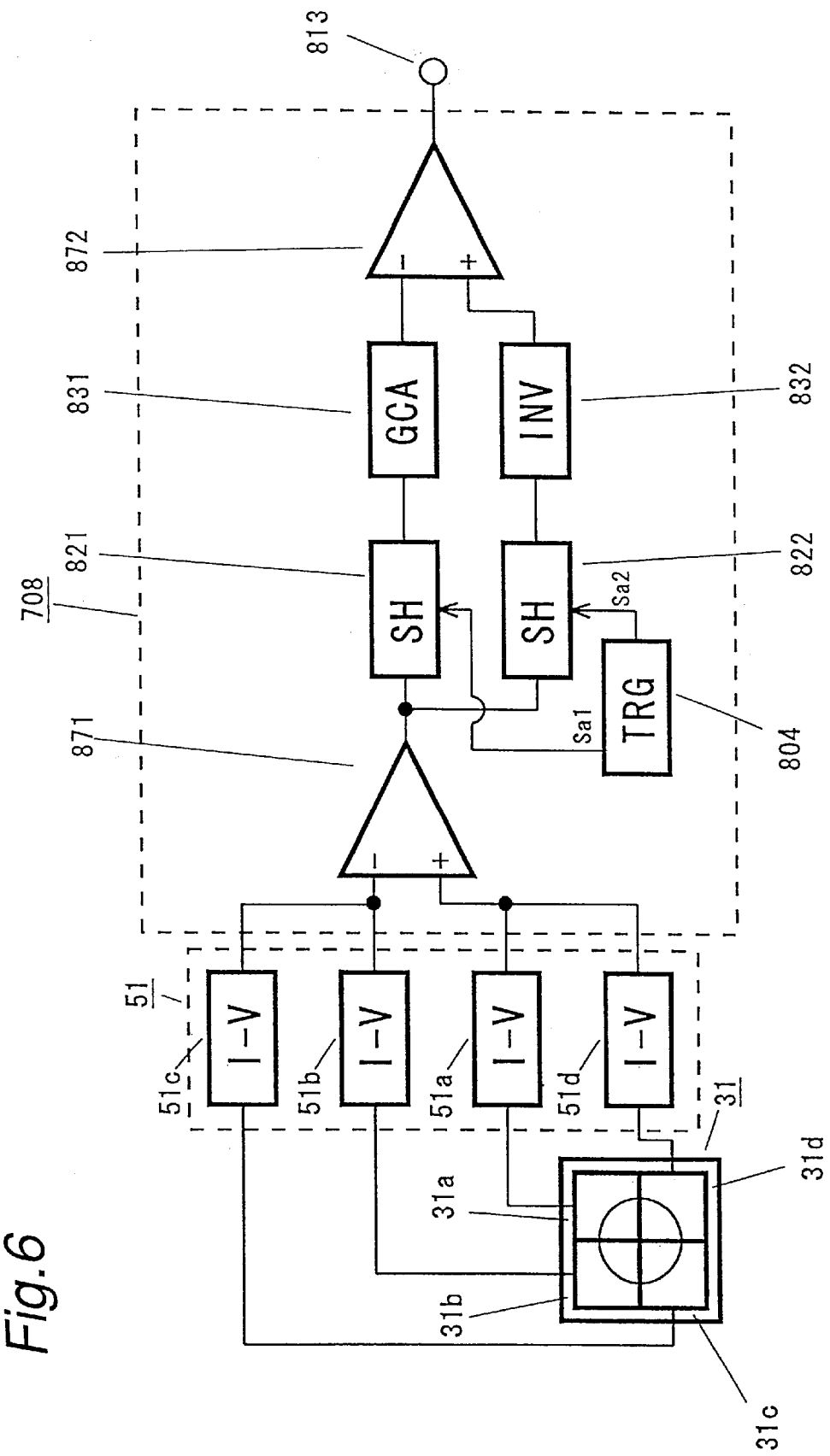
FIG. 6 shows the configuration of a signal processing circuit in a tilt detection unit according to a second embodiment of the present invention.

FIG. 6 shows the signal processor 708 in a tilt detection apparatus according to this embodiment of the invention. Insofar as the optical pickup head system for emitting a light beam output from a light source to the optical storage medium and detecting light reflected from the optical storage medium with a photodetector can, as in the first embodiment, detects a push-pull signal, it can be constructed as desired. To make the differences between this and the first embodiment more readily apparent, the optical system is the same as in the first embodiment.

The operation whereby signal processor 708 receives signals from the photodetector 31, differential operator 871 outputs a push-pull signal, sample-and-hold units 821 and 822 sample and hold the signal, and the output signal from sample-and-hold unit 822 is amplified by the variable gain amplifier 831 is the same as in the signal processor 707 of the first embodiment. In this embodiment, however, the signal output from sample-and-hold unit 821 is input to inverter 832 and signal polarity is inverted. The operator 872 differentiates the signal output from inverter 832 and the signal output from variable gain amplifier 831. The signal output from operator 872 is output from terminal 813. The signal output from terminal 813 indicates the tilt of the optical axis of the beam converged on the disk.

The polarity of the signal output from sample-and-hold unit 821 is inverted by the inverter 832 in this embodiment so that the signal sampled at timing Sa1 is the signal from when beam 70 is incident to the groove, and the signal sampled at timing Sa2 is the signal from when beam 70 is incident to the space between grooves. That various variations are optically possible, and the features of the tilt detection apparatus and resulting benefits, are as described with reference to the tilt detection apparatus of the first embodiment.

It will be further noted that whereas tilt detection is enabled in the first embodiment by using a characteristic feature of five guide grooves, it will be noted that tilt detection is achieved in this embodiment using a feature of only three guide grooves. As a result of the groove area used for tilt detection being smaller with the tilt detection apparatus of this embodiment, the capacity of the optical storage medium is increased accordingly.

Furthermore, the inverter 832 is disposed between sample and-hold unit 822 and the operator 872 in the signal processor 708 of this embodiment, but other arrangements can be used insofar as the polarity of the input signals differentiated by the operator 872 are inverted. For example, if operator 872 performs an addition, inverter 832 is unnecessary, circuit scale can be reduced, and a lower cost tilt detection apparatus can be provided.

Embodiment 3

Figure 7:
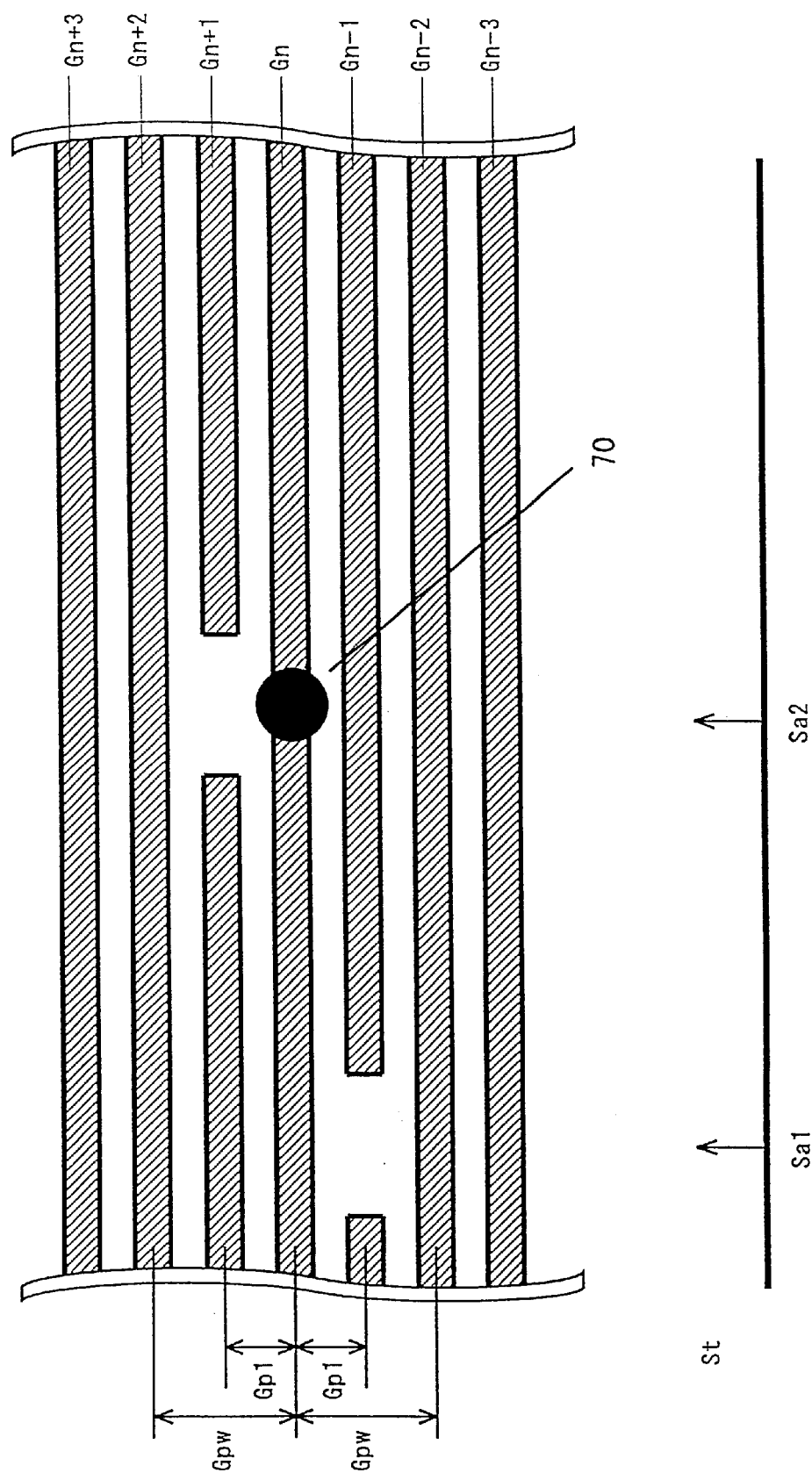
FIG. 7 shows the configuration of an optical storage medium in a tilt detection unit according to a third embodiment of the present invention.

FIG. 7 shows the configuration of a data recording medium in a tilt detection apparatus according to a further embodiment of the present invention. Gn−3, . . . Gn+3 are guide grooves as in the first embodiment. The signal processor used in the first embodiment can be used for the signal processor in this embodiment. Tilt detection is enabled using a characteristic feature of five guide grooves. If guide groove Gn is the guide groove used for tilt detection when a beam is emitted, an intermittent groove having part of the guide groove eliminated at a certain interval is formed at groves Gn−1 and Gn+1. Unlike in the first embodiment, however, a space is not formed in the adjacent guide groove Gn+1 where a space is formed in guide groove Gn−1, and a space is not formed in adjacent groove Gn−1 where a space is formed in guide groove Gn+1. When the beam from the optical pickup head system then scans groove Gn along the track to record or reproduce data, the converged beam 70 senses the groove pitch as Gpw on one side and Gp1 on the other side at each space in grooves Gn−1 and Gn+1. Signal sampling is again at Sa1 and Sa2.

Figure 8:
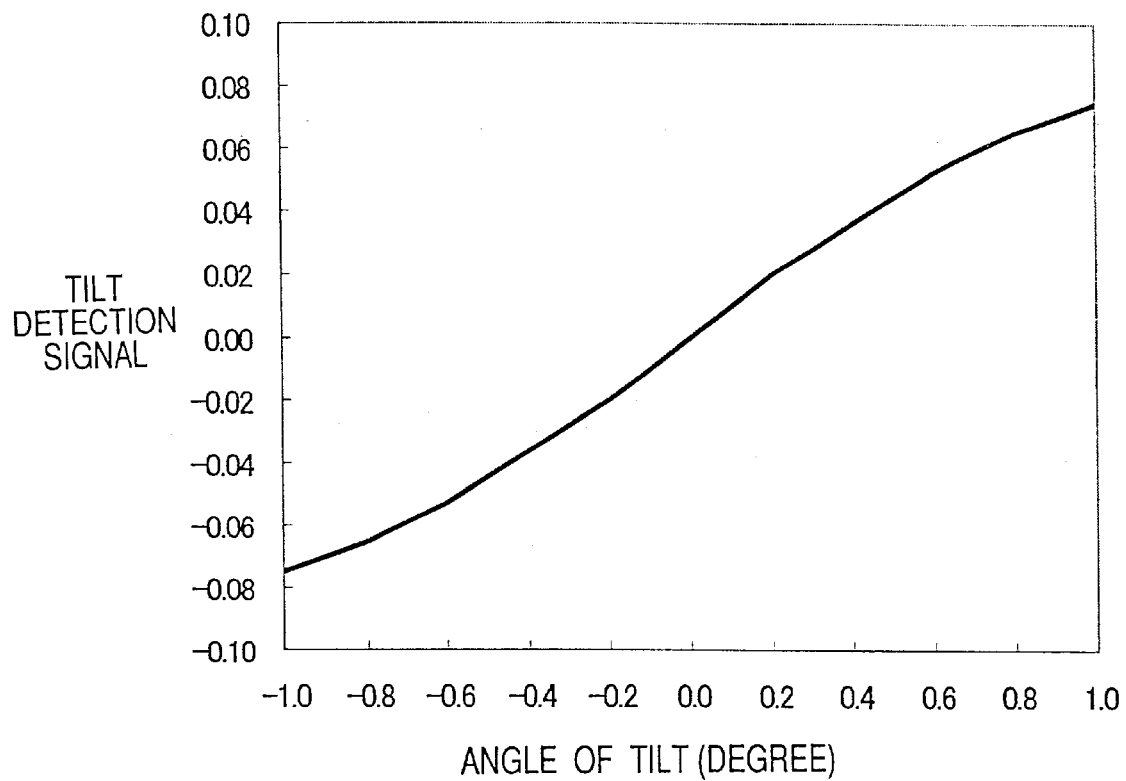
FIG. 8 shows a tilt detection signal obtained in a tilt detection unit according to a third embodiment of the present invention.

FIG. 8 shows a tilt detection signal from the tilt detection apparatus in this embodiment. NA=0.85, λ=405 nm, groove pitch Gp1=0.34 μm and Gp2=0.68 μm.

As in the tilt detection apparatuses described above, a good tilt detection signal is obtained with this embodiment.

Embodiment 4

Figure 9:
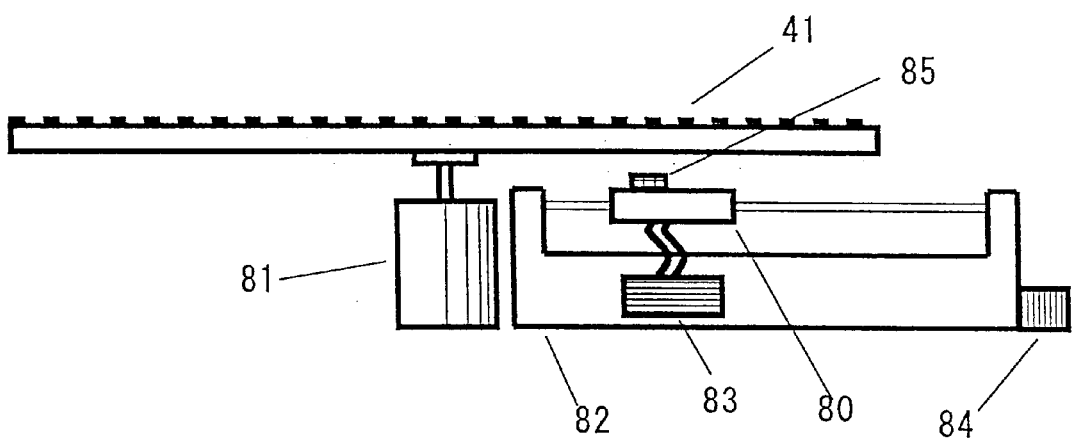
FIG. 9 shows the configuration of a data recording and reproducing apparatus according to a fourth embodiment of the present invention.

FIG. 9 shows a data recording and reproducing apparatus with a tilt detection apparatus such as described above. This data recording and reproducing apparatus has an optical pickup head system 80, optical storage medium drive unit 81, optical pickup head drive unit 82, electrical circuit 83, power supply unit 84, and objective lens drive unit 85. The optical storage medium drive unit 81 spins the optical storage medium 41. The optical pickup head system 80 sends a signal corresponding to the relative positions of the optical pickup head system 80 and optical storage medium 41 to electrical circuit 83. Signals from the optical pickup head system are amplified or operated on by the electrical circuit 83, then supplied to the optical pickup head drive unit 82 and actuator in the optical pickup head system, and used to move the optical pickup head system 80 or objective lens in the optical pickup head system. The electrical circuit 83 receives signals output from the optical pickup head system, demodulates data recorded to the optical storage medium 41, and detects a signal indicative of optical storage medium tilt. A signal processor according to the present invention as described above is used for tilt signal detection. The tilt detection signal is applied to the objective lens drive unit 85, which drives the objective lens of the optical pickup head system to reduce the effects of optical storage medium tilt.

The tilt detection signal is obtained by emitting a beam from the optical pickup head system to a groove of the optical storage medium. That is, the beam for recording or reproducing data is the same beam used for tilt detection. Closed loop control can therefore be used for tilt correction even if the means for correcting the effects of optical storage medium tilt is a method whereby the objective lens drive unit 85 moves the objective lens of the optical pickup head system. Other methods can also be used, including moving the entire optical pickup head system, correcting the wavefront of the beam using a liquid crystal element, or some other known tilt correction means or coma correction means. A small, highly reliable data recording and reproducing apparatus enabling closed loop control can be achieved if a configuration moving only the objective lens or a configuration correcting the wavefront of the beam using a liquid crystal element is used. Power is supplied from a power supply or power supply connector 84 to the electrical circuit 83, optical pickup head drive unit 82, and optical storage medium drive unit 81. It will also be obvious that the power supply or a power supply connection terminal could be disposed to the individual drive circuits.

As described above, tilt can be detected using the beam for recording or reproducing data by eliminating a part of a groove on the optical storage medium. Tilt can therefore be detected without providing other parts specifically for tilt detection, and a low cost, highly reliable data recording and reproducing apparatus can be provided.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical storage medium having guide grooves with a pitch of Gp1 between adjacent grooves, comprising:

groove Gn−1 and groove Gn+1 adjacent to opposite sides of an n-th groove Gn, said groove Gn−1 and groove Gn+1 being both intermittent grooves with non-groove spaces formed therein, providing an area where pitch Gp2 of groove Gn is equivalent to twice pitch Gp1; and satisfying $$\lambda/NA \geq Gp1 \geq \lambda/(2 \cdot NA)$$

where λ is a wavelength of a beam emitted for recording or reproducing data, and NA is the numerical aperture of the convergent system for converging the beam on the optical storage medium.

2. An optical storage medium having guide grooves with a pitch of Gp1 between adjacent grooves, comprising:

an intermittent groove being formed with non-groove spaces therein, providing an area where groove pitch Gp2 is equivalent to twice pitch Gp1, and satisfying $$\lambda/NA \geq Gp1 \geq \lambda/(2 \cdot NA)$$

where λ is a wavelength of a beam emitted for recording or reproducing data, and NA is the numerical aperture of the convergent system for converging the beam on the optical storage medium.

3. An optical storage medium having guide grooves with a pitch of Gp1, comprising:

at least one of groove Gn−1 and groove Gn+1 adjacent to opposite sides of an n-th groove Gn is an intermittent groove with non-groove spaces formed therein, providing an area where groove pitch Gp2 is equivalent to greater than twice pitch Gp1; and satisfying $$\lambda/NA \geq Gp1 \geq \lambda/(2 \cdot NA)$$

where λ is a wavelength of a beam emitted for recording or reproducing data, and NA is the numerical aperture of the convergent system for converging the beam on the optical storage medium.

4. A tilt detection apparatus comprising:

a laser light source for emitting a beam;

a convergent system for converging the beam emitted from the light source to a small spot on a data recording medium;

a photodetector for detecting the beam diffracted and reflected by the data recording medium, and outputting a signal according to the light quantity of the detected beam; and a signal processor for receiving a first signal and a second signal output from the photodetector and processing the received signal to output a signal related to an angle formed between the optical storage medium and optical axis of the convergent system;

said tilt detection apparatus for use with an optical storage medium having guide grooves with a pitch of Gp1 between adjacent grooves, groove Gn−1 and groove Gn+1 adjacent to opposite sides of an n-th groove Gn both being intermittent grooves with nongroove spaces formed therein, providing an area where pitch Gp2 of groove Gn is equivalent to twice pitch Gp1, and satisfying $$\lambda/NA \geq Gp1 \geq \lambda/(2 \cdot NA)$$

where λ is a wavelength of a beam emitted for recording or reproducing data, and NA is the numerical aperture of the convergent system for converging the beam on the optical storage medium, the pitch of the groove on the optical storage medium when the first signal is obtained is Gp1, and the pitch of the groove on the optical storage medium when the second signal is obtained is Gp2.

5. A data recording and reproducing apparatus with a tilt detection apparatus as described in claim 4, comprising;

a drive unit for changing a relative position between the data recording medium and tilt detection apparatus; and an electric signal processor for receiving and processing a signal output from the tilt detection apparatus to obtain desired information stored on the optical storage medium.

6. A tilt detection apparatus comprising:

a laser light source for emitting a beam;

a convergent system for converging the beam emitted from the light source to a small spot on a data recording medium;

a photodetector for detecting the beam diffracted and reflected by the data recording medium, and outputting a signal according to the light quantity of the detected beam; and a signal processor for receiving a first signal and a second signal output from the photodetector and processing the received signal to output a signal related to an angle formed between the optical storage medium and optical axis of the convergent system;

said tilt detection apparatus for use with an optical storage medium having guide grooves with a pitch of Gp1 between adjacent grooves, an intermittent groove being formed with non-groove spaces therein, providing an area where groove pitch Gp2 is equivalent to twice pitch Gp1, and satisfying $$\lambda/NA \geq Gp1 \geq \lambda/(2 \cdot NA)$$

where λ is a wavelength of a beam emitted for recording or reproducing data, and NA is the numerical aperture of the convergent system for converging the beam on the optical storage medium, the pitch of the groove on the optical storage medium when the first signal is obtained is Gp1, and the pitch of the groove on the optical storage medium when the second signal is obtained is Gp2.

7. A data recording and reproducing apparatus with a tilt detection apparatus as described in claim 6, comprising;

a drive unit for changing a relative position between the data recording medium and tilt detection apparatus; and an electric signal processor for receiving and processing a signal output from the tilt detection apparatus to obtain desired information stored on the optical storage medium.

8. A tilt detection apparatus comprising:

a laser light source for emitting a beam;

a convergent system for converging the beam emitted from the light source to a small spot on a data recording medium;

a photodetector for detecting the beam diffracted and reflected by the data recording medium, and outputting a signal according to the light quantity of the detected beam; and a signal processor for receiving a first signal and a second signal output from the photodetector and processing the received signal to output a signal related to an angle formed between the optical storage medium and optical axis of the convergent system;

said tilt detection apparatus for use with an optical storage medium having guide grooves with a pitch of Gp1 between adjacent grooves, at least one of groove Gn−1 and groove Gn+1 adjacent to opposite sides of an n-th groove Gn being an intermittent groove with non-groove spaces formed therein, providing an area where groove pitch Gp2 is equivalent to greater than twice pitch Gp1, and satisfying $$\lambda/NA \geq Gp1 \geq \lambda/(2 \cdot NA)$$

where λ is a wavelength of a beam emitted for recording or reproducing data, and NA is the numerical aperture of the convergent system for converging the beam on the optical storage medium, the pitch of the groove on the optical storage medium when the first signal is obtained is Gp1, and the pitch of the groove on the optical storage medium when the second signal is obtained is Gp2.

9. A data recording and reproducing apparatus with a tilt detection apparatus as described in claim 8, comprising;

a drive unit for changing a relative position between the data recording medium and tilt detection apparatus; and an electric signal processor for receiving and processing a signal output from the tilt detection apparatus to obtain desired information stored on the optical storage medium.

* * * * *